United States Patent
Kang et al.

(10) Patent No.: US 12,439,360 B2
(45) Date of Patent: Oct. 7, 2025

(54) SERVICE OBTAINING METHOD AND APPARATUS, AND COMMUNICATION DEVICE AND READABLE STORAGE MEDIUM

(71) Applicant: VIVO MOBILE COMMUNICATION CO., LTD., Dongguan (CN)

(72) Inventors: Yanchao Kang, Dongguan (CN); Fei Qin, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 400 days.

(21) Appl. No.: 17/993,864

(22) Filed: Nov. 23, 2022

(65) Prior Publication Data
US 2023/0096402 A1    Mar. 30, 2023

Related U.S. Application Data

(63) Continuation of application No. PCT/CN2021/096692, filed on May 28, 2021.

(30) Foreign Application Priority Data

May 28, 2020   (CN) .......................... 202010471085.7

(51) Int. Cl.
H04W 60/04    (2009.01)
H04W 8/18     (2009.01)
H04W 48/16    (2009.01)
H04W 48/18    (2009.01)

(52) U.S. Cl.
CPC ............. *H04W 60/04* (2013.01); *H04W 8/18* (2013.01); *H04W 48/16* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 10,531,305 B1* | 1/2020 | Verma | H04W 12/08 |
| 2019/0313358 A1* | 10/2019 | Lee | H04L 67/141 |

FOREIGN PATENT DOCUMENTS

| | | |
|---|---|---|
| CN | 102984686 A | 3/2013 |
| CN | 103475512 A | 12/2013 |
| CN | 109151804 A | 1/2019 |
| CN | 109168171 A | 1/2019 |
| CN | 109756938 A | 5/2019 |
| CN | 110431862 A | 11/2019 |
| CN | 110650500 A | 1/2020 |

(Continued)

OTHER PUBLICATIONS

Extended European Search Report issued in related European Application No. 21813736.2, mailed Sep. 19, 2023, 8 pages.

(Continued)

*Primary Examiner* — Adolf Dsouza
(74) *Attorney, Agent, or Firm* — IPX PLLC

(57) ABSTRACT

A service obtaining method and apparatus, a communications device, and a readable storage medium, are provided. The service obtaining method performed by a terminal includes obtaining subscription data from a second network; selecting a first network by using the subscription data, and accessing the first network; and obtaining a subscription service corresponding to the subscription data from the first network.

20 Claims, 6 Drawing Sheets

(56) References Cited

FOREIGN PATENT DOCUMENTS

| JP | 2005534265 | A | 11/2005 | | |
|---|---|---|---|---|---|
| JP | 2009532922 | A | 9/2009 | | |
| WO | 2018128020 | A1 | 7/2018 | | |
| WO | 2019024816 | A1 | 2/2019 | | |
| WO | 2019137547 | A1 | 7/2019 | | |
| WO | WO-2020098609 | A1 * | 5/2020 | ............ | H04W 12/06 |

OTHER PUBLICATIONS

Notice of Reasons for Refusal issued in related Japanese Application No. 2022-572363, mailed Aug. 29, 2023, 8 pages.
International Search Report issued in corresponding International Application No. PCT/CN2021/096692, mailed Aug. 11, 2021, 4 pages.
First Office Action issued in related Chinese Application No. 202010471085.7, mailed Mar. 30, 2022, 10 pages.
Second Office Action issued in related Chinese Application No. 202010471085.7, mailed Jan. 20, 2023, 5 pages.
Intel, "Solution for Non-public network supporting service providers", 3GPP SA WG2 Meeting #136, S2-1911353, Nov. 2019.
Ericsson, "Solution for UE Onboarding and provisioning for an SNPN", SA WG2 Meeting #S2-136AH, S2-2000518, Jan. 2020.

\* cited by examiner

SERVICE OBTAINING METHOD AND APPARATUS, AND COMMUNICATION DEVICE AND READABLE STORAGE MEDIUM

CROSS-REFERENCE TO RELATED APPLICATION

The present application is a continuation of International Application No. PCT/CN2021/096692, filed on May 28, 2021, which claims priority to Chinese Patent Application No. 202010471085.7, filed on May 28, 2020. The entire contents of each of the above-identified applications are expressly incorporated herein by reference.

TECHNICAL FIELD

The present application belongs to the field of communications technologies, and in particular, to a service obtaining method and apparatus, a communications device, and a readable storage medium.

BACKGROUND

Currently, when a terminal obtains a business service from a certain network, it needs to sign a contract with an operator of the network in advance, and obtain a service provided by the operator based on subscription data. It can be learned from that the existing service obtaining method is relatively simple.

SUMMARY

Embodiments of the present application provides a service obtaining method and apparatus, a communications device, and a readable storage medium.

According to a first aspect, a service obtaining method is provided, where the method is applied to a terminal and includes:
  obtaining subscription data from a second network;
  selecting a first network by using the subscription data, and accessing the first network; and
  obtaining a subscription service corresponding to the subscription data from the first network.

According to a second aspect, a service obtaining method is provided, where the method is applied to a network side device in a first network and includes:
  establishing a connection to a terminal, where the connection is requested to be established by the terminal using subscription data, and the subscription data is obtained by the terminal from a second network; and
  transmitting a subscription service corresponding to the subscription data to the terminal.

According to a third aspect, a service obtaining method is provided, where the method is applied to a network side device in a second network and includes:
  sending subscription data to a terminal; where the subscription data is used to select, by the terminal, a first network according to the subscription data, access the first network, and obtain a subscription service corresponding to the subscription data from the first network.

According to a fourth aspect, a service obtaining apparatus is provided, where the apparatus is applied to a terminal and includes:
  a first obtaining module, configured to obtain subscription data from a second network;
  a selecting module, configured to select a first network by using the subscription data;
  an access module, configured to access the first network; and
  a second obtaining module, configured to obtain a subscription service corresponding to the subscription data from the first network.

According to a fifth aspect, a service obtaining apparatus is provided, where the apparatus is applied to a network side device in a first network and includes:
  an establishment module, configured to establish a connection to a terminal, where the connection is requested to be established by the terminal using subscription data, and the subscription data is obtained by the terminal from a second network; and
  a transmission module, configured to transmit a subscription service corresponding to the subscription data to the terminal.

According to a sixth aspect, a service obtaining apparatus is provided, where the apparatus is applied to a network side device in a second network and includes:
  a sending module, configured to send subscription data to a terminal; where the subscription data is used to select, by the terminal, a first network according to the subscription data, access the first network, and obtain a subscription service corresponding to the subscription data from the first network.

According to a seventh aspect, a communications device is provided, where the communications device includes a processor, a memory, and a program or an instruction stored in the memory and executable on the processor. When the program or the instruction is executed by the processor, the steps of the method according to the first aspect, or the steps of the method according to the second aspect, or the steps of the method according to the third aspect are implemented.

According to an eighth aspect, a readable storage medium is provided, where the readable storage medium stores a program or an instruction, and when the program or the instruction is executed by a processor, the steps of the method according to the first aspect, or the steps of the method according to the second aspect, or the steps of the method according to the third aspect are implemented.

According to a ninth aspect, a chip is provided, where the chip includes a processor and a communications interface, the communications interface is coupled to the processor, and the processor is configured to run a program or an instruction of a network side device, to implement the steps of the method according to the first aspect, or the steps of the method according to the second aspect, or the steps of the method according to the third aspect.

According to a tenth aspect, a computer software product is provided, where the computer software product is stored in a nonvolatile storage medium, and the software product is configured to be executed by at least one processor to implement the steps of the method according to the first aspect, or the steps of the method according to the second aspect, or the steps of the method according to the third aspect.

According to an eleventh aspect, a communications device is provided, where the communications device is configured to implement the method according to the first aspect, or the method according to the second aspect, or the method according to the third aspect.

DETAILED DESCRIPTION

The following describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

The terms "first," "second," and the like in this specification and claims of the present application are used to distinguish between similar objects instead of describing a specific order or sequence. It should be understood that the data used in this way may be interchangeable in appropriate circumstances so that the embodiments of the present application described can be implemented in other orders than the order illustrated or described herein, and objects distinguished by "first" and "second" are usually of one type, which does not limit a quantity of the objects, for example, a first object may be one or more than one. In addition, in the specification and claims, "and/or" is used to indicate at least one of connected objects, and the character "/" usually indicates that associated objects are in an "or" relationship.

It is worth noting that the technology described in this specification is not limited to a Long Term Evolution (LTE)/LTE-Advanced (LTE-A) system, can also be applied to other wireless communications systems, such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA) and other systems. The terms "system" and "network" in the embodiments of the present application are often used interchangeably, and the technologies described may be used in the systems and radio technologies mentioned above, and may also be used in another system and radio technology. However, a New Radio (NR) system is described below as an example, and the term NR is used in most of the descriptions, although these technologies can also be used in an application other than an application of the NR system, for example, a 6th generation (6G) communications system.

Figure 1:
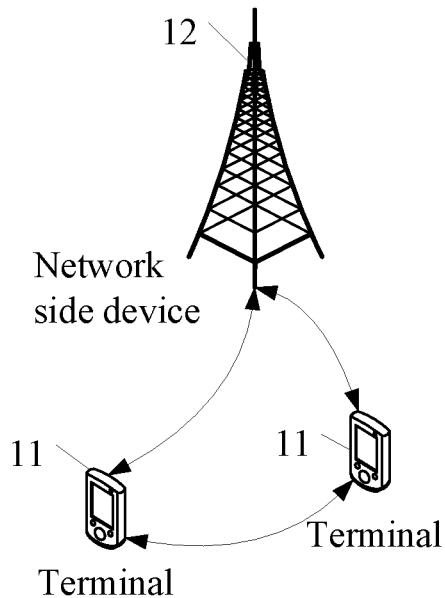
FIG. 1 is a schematic structural diagram of a wireless communications system according to an embodiment of the present application.

FIG. 1 is a block diagram of a wireless communications system to which an embodiment of the present application may be applied. The wireless communications system includes a terminal 11 and a network side device 12. The terminal 11 may be also referred to as a terminal device or a User Equipment (UE). The terminal 11 may be a terminal side device such as a mobile phone, a tablet personal computer, a laptop computer or referred to as a notebook computer, a Personal Digital Assistant (PDA), a palmtop computer, a netbook, an Ultra-Mobile Personal Computer (UMPC), a Mobile Internet Device (MID), a wearable device or Vehicle User Equipment (VUE), Pedestrian User Equipment (PUE). The wearable device includes bracelets, earphones, glasses, or the like. It should be noted that a specific type of the terminal 11 is not limited in the embodiments of the present application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a Wireless Local Area Network (WLAN) access point, a Wireless Fidelity (WiFi) node, a Transmitting Receiving Point (TRP) or another appropriate term in the art. Provided that the same technical effects are achieved, the base station is not limited to specific technical vocabulary. It should be noted that in some embodiments of the present application, the base station in the NR system is merely used as an example, but does not limit a specific type of the base station.

An entity in the core network includes but is not limited to an Access Management Function (AMF), an AUthentication Server Function (AUSF), a Policy Control Function (PCF), a Session Management Function (SMF), a User Plane Function (UPF), a Charging Function (CHF), Unified Data Management (UDM), a Network Exposure Function (NEF), and the like.

With reference to the accompanying drawings, the following describes the service obtaining method in the embodiments of the present application in detail based on specific embodiments and application scenarios thereof.

Figure 2:
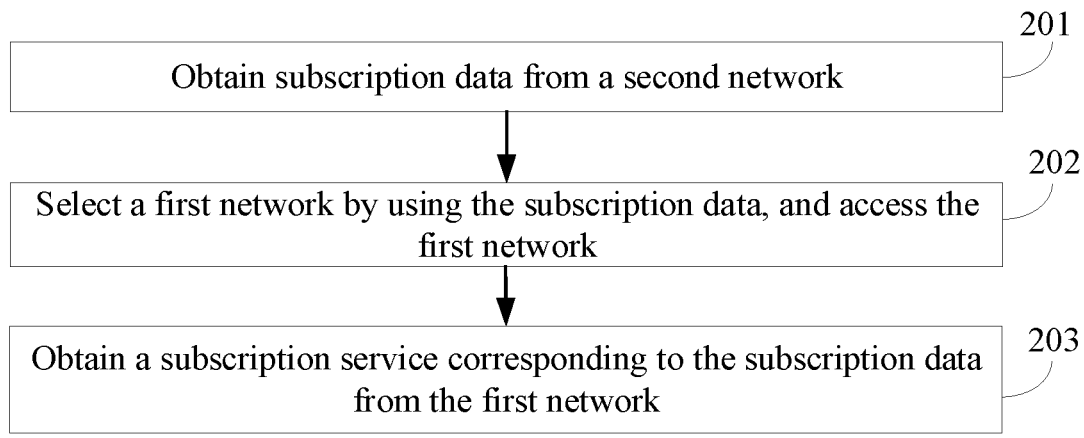
FIG. 2 is a flowchart of a service obtaining method according to an embodiment of the present application.

Referring to FIG. 2, FIG. 2 is a flowchart of a service obtaining method according to an embodiment of the present application. The method is applied to a terminal. As shown in FIG. 2, the method includes the following steps.

Step 201: obtain subscription data from a second network.

Step 202: select a first network by using the subscription data, and access the first network.

Step 203: obtain a subscription service corresponding to the subscription data from the first network.

In some embodiments of the present application, the first network and the second network may belong to a same network, or may belong to different networks. In some implementations, the first network may be a 5th generation (5G) Public Land Mobile Network (PLMN), a Non-Public Network (NPN), or another mobile communication network. The second network may be a 5G PLMN, an NPN, a third-party service provider network, a handset manufacturer's network, or another mobile communication network.

In some implementations, a terminal may obtain the subscription service in a form of multicast or broadcast in the first network. Before obtaining the subscription service in the form of multicast or broadcast, the terminal may receive access information for obtaining a multicast or broadcast service that is provided by the first network.

It may be understood that the above-mentioned obtaining the subscription data from the second network essentially is that: the terminal obtains the subscription data from a network side device and/or an application layer in the second network. The above-mentioned accessing the first network essentially is that: the terminal establishes a connection to a network side device in the first network. The above-mentioned obtaining the subscription service from the first network essentially is that: the terminal obtains a subscription service from the network side device in the second network.

In the service obtaining method of some embodiments of the present application, a terminal may obtain subscription data from a second network; select a first network by using the subscription data, and access the first network; and obtain a subscription service corresponding to the subscription data from the first network. Therefore, it supports the terminal to dynamically obtain subscription data through a third-party entity, and to obtain a subscription service in a current network (previously not associated with the terminal) based on the subscription data, thereby enriching the service obtaining method.

In some embodiments of the present application, the foregoing subscription data (credentials) may also be referred to as specific subscription data. The foregoing subscription data may be any one of permanent subscription data and temporary subscription data, that is, the subscription data may be temporary subscription data, or may be permanent subscription data.

The permanent subscription data may be 5G PLMN subscription data, NPN subscription data, or other mobile network subscription data.

The temporary subscription data may be: 1) 5G PLMN subscription data, NPN subscription data, or other mobile network subscription data for a certain period of time, where the subscription data is only valid for this period of time, such as several days after accessing the network; 2) subscription data of a certain service, such as subscription data of audio/video of concerts, video of competition events, and Augmented Reality (AR)/Virtual Reality (VR) services of games, where the subscription data may specify a Quality of Service (QoS) level for providing a service; and 3) subscription data of specific locations, such as subscription data of wireless data services in specific locations such as shopping malls, conference venues, and campuses. The types of the temporary subscription data are not limited in some embodiments of the present application.

In some implementations, the second network provides a subscription method for the terminal, that is, the terminal obtains subscription data from the second network in a manner that may include any one of the following:

a, the terminal obtains the subscription data through the application layer of the second network; for example, the terminal obtains the subscription data through an application layer form such as a direct connection to the second network and logging in a web page or an Application (APP) of the second network;

b, the terminal obtains the subscription data through a physical entity of the second network; where the physical entity includes but is not limited to a Subscriber Identification Module (SIM) of the second network; and c, the terminal obtains the subscription data through the application layer and the physical entity of the second network. For example, the second network provides subscription data for the terminal in a form of an embedded SIM card (eSIM card) or a soft SIM card (soft SIM).

In some implementations, while providing subscription data for the terminal, the second network may also provide the subscription data to a first network that has a cooperative relationship. The first network may store the subscription data in a subscription database such as Unified Data Management (UDM).

In some implementations, the subscription data provided by the second network for the terminal may include an access security token that is provided for the terminal and is used for authenticating a legitimate base station in the first network. Further, the second network may also provide a same access security token for the first network.

In some implementations, an express form of the foregoing subscription data may be any one of the following:

1) subscription data including a terminal identifier; where the terminal identifier may be a permanent terminal identifier, such as an International Mobile Subscriber Identity (IMSI), a SUbscription Permanent Identifier SUPI), or a terminal permanent identifier in other forms;

2) a service access identifier including at least one of a user name and a password; in this case, the first network and the second network may agree on a form of authenticating the terminal, such as a secondary authorization or authentication process during the establishment of a Packet Data Unit (PDU) session (Secondary authentication/authorization by a Data Network (DN)-AAA server during the establishment of a PDU Session);

3) a service access identifier including at least one of a user name and a password; in this case, the first network and the second network may agree on a form of authenticating the terminal, such as a Network Slice-Specific Authorization and Authentication (NS-SAA) process.

In some implementations, the foregoing subscription data may further include at least one of the following:

a subscription service name;
location information for providing a subscription service;
time information for providing a subscription service;
one or more first network identifiers;
a second network identifier;
an access security token;
a service security certificate;
a slice identifier for providing a subscription service;
QoS information for providing a subscription service; and
a data network name for providing a subscription service; for example, the data network name may be an Access Point Name (APN), a Data Network Name (DNN), or a data network name in other forms.

In some implementations, before the terminal obtains a service through the first network, it needs to access the first network, and complete the authentication and identification process through the subscription data.

In some implementations, before the terminal obtains the subscription data from the second network, the terminal also needs to complete a user real-name authentication process. The user real-name authentication process includes but is not limited to a user input personal IDentifier (ID), a user input facial ID, or the like.

In some implementations, before using the subscription data to select the first network, the terminal may also use the subscription data and/or an indication identifier in broadcast information of the first network to determine that the first network is able to provide the subscription service, that is, determining that the first network can provide the required service.

The indication identifier in the broadcast information of the first network may be, but not limited to, any one of the following:
1) an identifier of providing a service for a second network user, such as an "operator name," a "service provider name," and a "location (shopping mall, school, gymnasium) name," or the like;
2) a service content identifier, such as an identifier of a "concert," a "competition event," a "game," or the like.

In some implementations, the first network may add an indicating bit in existing System Information Block (SIB), or add new SIB, which is used for broadcasting the indication identifier.

In some implementations, the process of determining that the first network is able to provide the subscription service may include but is not limited to any one of the following:
in a case that the indication identifier is a service name, if the service name is included in a subscription service name provided by the subscription data, determining that the first network is able to provide the subscription service;
in a case that the indication identifier is service location information, if the service location information is included in location information that is for providing a subscription service and is provided by the subscription data, determining that the first network is able to provide the subscription service;
in a case that the indication identifier is a second network identifier, if the second network identifier is a second network identifier provided by the subscription data, determining that the first network is able to provide the subscription service; and
in a case that the indication identifier is a first network identifier, if one or more first network identifiers included in the subscription data include the first network identifier, determining that the first network is able to provide the subscription service.

In some embodiments of the present application, when the terminal detects the first network, authentication on the first network is performed by the terminal through a certain security mechanism. The security mechanism may be that:
1) the second network and the terminal complete an interaction process through a subscription process, and the second network provides the token while providing the subscription data for the terminal;
2) the second network may also provide a same token for the first network;
3) the indication identifier in the broadcast information of the first network, that is, a specific indication broadcast by the first network, such as the service name, the first network identifier, the second network identifier, or the like, which is a ciphertext encrypted by the token; or
4) the terminal decrypts the ciphertext field in the SIB of the first network by using the token provided by the second network, obtains a plaintext indication identifier, and compares it with the indication identifier provided by the second network to determine whether the current network has a legitimate first network base station authorized by the second network.

In some implementations, the process of determining that the first network is able to provide the subscription service may include: obtaining the broadcast information of the first network, where the broadcast information includes a first ciphertext; decrypting the first ciphertext by using a token obtained from the second network; in a case of decrypting to obtain a plaintext indication identifier, determining that the first network is a legitimate network authorized by the second network; and if the plaintext indication identifier is included in the obtained subscription data, determining that the first network is able to provide the subscription service.

In some embodiments of the present application, the process of the terminal accessing the first network may be: sending a registration request message to the first network by using the subscription data obtained from the second network, completing an authentication and identification process in a registration process initiated according to the registration request message, and accessing the first network. In some implementations, the registration request message may include: a slice identifier that provides a service for the terminal. Namely, the terminal needs to include a slice identifier that provides a service for the terminal in request slice information provided in the registration request message.

In some implementations, the foregoing authentication and identification process may include a real-name authentication process, that is, completing the real-name authentication process in a registration process. For example, according to the requirements of a specific country or region, if real-name authentication is required for the service accessing the first network, the real-name authentication process is completed in the authentication and identification process of the registration process. The real-name authentication process may include any one of the following:
in a case that the terminal and the second network have been authenticated by real names, completing, by the terminal, the real-name authentication process (including but not limited to a user input personal ID, a user input facial ID, or the like) while obtaining the subscription data from the second network, and completing, by the first network, the real-name authentication process by interacting with the second network; and
in a case that the terminal and the second network have not been authenticated by real names, completing, by the terminal and the first network, the real-name authentication process (including but not limited to a user input personal ID, a user input facial ID, or the like) through a real-name authentication interaction process.

In some implementations, in a case that the subscription data does not include a terminal identifier, after the sending a registration request message to the first network, the terminal may further skip the authentication and identification process in the registration process initiated according to the registration request message, and access the first network.

In some implementations, when UE initiates the registration process in the first network, the relevant authentication and identification conditions may include:
a, in the registration process, completing the authentication and identification process by using the subscription data obtained from the second network;
1a.1, if the subscription data provided by the second network is subscription data including UE identifiers such as IMSI or SUPI, and the authentication and identification process may be selected as an authentication and identification process in the existing registration process of the 5G network:
a.1.1, if subscription of the UE may be found in the subscription database of the first network, the first network performs the existing authentication and identification process; in some implementations, the real-name authentication process is completed in the authentication and identification process, for example, referring to the above-mentioned real-name authentication process;

a.1.2, if there is no subscription of the UE in the subscription database of the first network, the first network needs to determine the second network that provides subscription for the UE according to the UE's instruction (newly added in the registration request message, the second network identifier, or the like) or the UE's identifier and other information, obtains subscription corresponding to the UE identifier from the second network, and performs the existing authentication and identification process; in some implementations, the real-name authentication process is completed in the authentication and identification process, for example, referring to the above-mentioned real-name authentication process;

a.2, if the subscription data provided by the second network is not subscription data including UE identifiers such as IMSI or SUPI, the UE needs to provide a special indication (for example, it is indicated by a requested slice identifier) during the registration process, and the first network skips the authentication and identification process in the existing registration process and marks the UE as a special user. Further, if the first network and the second network agree to authenticate the UE in a form of Network Slice-Specific Authorization and Authentication (NSSAA), the first network may perform the slice authentication process for the UE based on the slice provided by the UE; in some implementations, the real-name authentication process is completed during the slice authentication process, for example, referring to the above-mentioned real-name authentication process;

b, after the registration process, the subscription data obtained from the second network or locally stored in the first network is used to complete the authentication and identification process; in some implementations, the real-name authentication process is completed in the authentication and identification process, for example, referring to the above-mentioned real-name authentication process.

In this embodiment of the present application, the process that a terminal obtains a subscription service corresponding to the subscription data from the first network may include: sending, by the terminal, a PDU session establishment request to the first network, establishing a PDU session data connection according to the PDU session establishment request, and obtaining the subscription service corresponding to the subscription data through the PDU session data connection.

In some implementations, before obtaining the subscription service from the first network, the terminal may obtain service-related policy information from the first network, including but not limited to a User equipment Routing Selection Policy (URSP), an access and mobility management policy, and the like. The URSP may include information such as a slice identifier of the PDU session established by the terminal for obtaining the data service, a DNN, and the like.

In some implementations, the terminal may carry other information such as a DNN and a slice identifier in the PDU session establishment request message. The information such as the DNN and the slice identifier may come from the subscription data obtained from the second network, or from URSP information provided by the first network.

In some implementations, in the process of establishing the PDU session data connection according to the PDU session establishment request, the terminal may perform the real-name authentication process in the secondary authorization or authentication process initiated by the first network.

Further, when the first network and the second network agree to authenticate the terminal in a form of performing an NSSAA process, before establishing the PDU session data connection, the terminal may further perform and complete a network slice-specific authorization and authentication process that is for a slice requested by a terminal and is initiated by the first network.

In some implementations, the network slice-specific authorization and authentication process includes: a real-name authentication process completed through a real-name authentication interaction process, including but not limited to a user input personal ID, a user input facial ID, or the like.

In an implementation, the UE establishes a PDU session data connection in the first network, and obtains subscription data. The relevant content may include:
1) if the first network and the second network agree to authenticate the UE in a form of a secondary authorization or authentication process in the PDU session establishment process (Secondary authentication/authorization by a DN-AAA server during the establishment of a PDU Session), the first network acts as a proxy for the second network to initiate a secondary authorization or authentication process; in some implementations, the real-name authentication process is completed in the authentication and identification process, for example, referring to the above-mentioned real-name authentication process;
2) the PDU session data connection may be associated with information such as the DNN and the slice identifier given in the subscription data; and
3) the UE may establish a QoS flow with a QoS level required by the subscription service, where the QoS level is a QoS level allowed in the subscription data or a policy provided by the first network.

In this embodiment of the present application, while or after the terminal obtains the subscription service, the first network and the second network complete a charging function. The terminal may perform charging data statistics and reporting according to indications of the first network.

In an implementation, the first network and the second network agree that a charging execution body is the first network, and agree on a charging division method. The first network completes the charging data statistics and generates a bill. A charging method agreed between the second network and the UE is: charging according to the flow rate.

In another implementation, the first network and the second network agree that a charging execution body is the second network, and agree on a charging division method. A charging method agreed between the second network and the UE is: charging according to the flow rate, charging according to service events (competition events, concerts, or the like), or charging according to duration (such as charging by month, or the like). The first network completes the charging data statistics and provides it to the second network, the second network charges the UE, and divides the charging according to the agreement with the first network.

Figure 3:
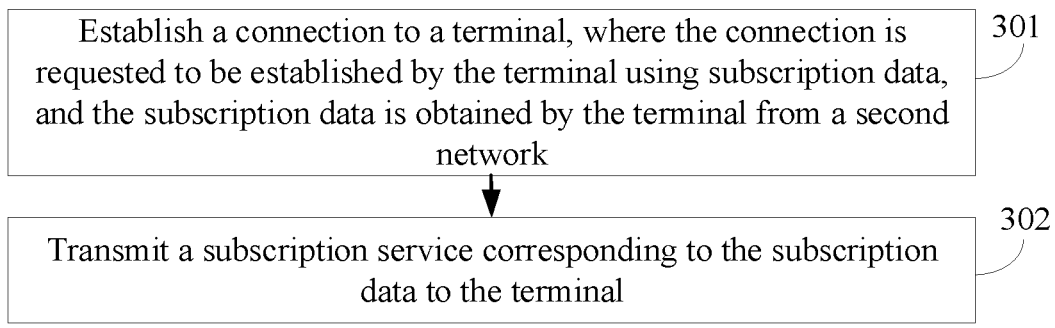
FIG. 3 is a flowchart of another service obtaining method according to an embodiment of the present application.

Referring to FIG. 3, FIG. 3 is a flowchart of a service obtaining method according to an embodiment of the present application. The method is applied to a network side device in a first network, including but not limited to a base station, an AMF, an AUSF, an SMF, a CHF, an NEF, and the like. As shown in FIG. 3, the method includes the following steps.

Step 301: establish a connection to a terminal, where the connection is requested to be established by the terminal using subscription data, and the subscription data is obtained by the terminal from a second network.

In this embodiment, the first network and the second network may belong to a same network, or may belong to different networks. The first network may be a 5G PLMN, an NPN, or another mobile communication network. The second network may be a 5G PLMN, an NPN, a third-party service provider network, a handset manufacturer's network, or another mobile communication network.

For specific content of the subscription data, reference may be made to the description of the foregoing method embodiment in FIG. 2, and details are not further described herein.

In an implementation, the above connection may be a PDU session connection, which is established by a PDU session establishment request of the terminal.

Step 302: transmit a subscription service corresponding to the subscription data to the terminal.

In an implementation, a terminal may obtain the subscription service in a form of multicast or broadcast in the first network. Before obtaining the subscription service in the form of multicast or broadcast, the terminal may receive access information for obtaining a multicast or broadcast service that is provided by the first network.

In the service obtaining method of the embodiment of the present application, it is possible to support the terminal to dynamically obtain subscription data through a third-party entity, and to obtain a subscription service in a current network (previously not associated with the terminal) based on the subscription data, thereby enriching the service obtaining method.

In this embodiment of the present application, the first network may negotiate agreement content for providing a service for the terminal with the second network. The agreement content includes at least one of the following: a subscription service name, location information for providing a subscription service, time information for providing a subscription service, a token, and a service security certificate.

In some implementations, based on the agreement content, the first network may send at least one of the following to the second network: a slice identifier, service QoS information, DNN, and the like.

In some implementations, based on the agreement content, the first network may obtain subscription data of the terminal from the second network.

In some implementations, the agreement content may further include at least one of the following: whether a slice requested by a terminal needs to perform a network slice-specific authorization and authentication (NSSAA) process, whether the terminal needs to perform a secondary authorization or authentication (Secondary authentication/authorization) process, a charging mechanism of the first network and the second network, and a real-name authentication mechanism.

In some implementations, based on the agreement content, the first network may further send broadcast information to the terminal. The broadcast information may include an indication identifier or an indication identifier encrypted with a token; and the indication identifier is used to determine, by the terminal, that the first network is able to provide the subscription service. For the indication identifier, refer to the descriptions in the embodiment in FIG. 2.

In an implementation, the base station in the first network sends broadcast information to the terminal.

In some implementations, based on the agreement content, the first network (for example, a base station in the first network) may provide the terminal with configuration information for obtaining the service in a form of broadcast or multicast.

In some implementations, the process of establishing a connection to a terminal may include: receiving a registration request message sent by the terminal, completing an authentication and identification process in a registration process initiated according to the registration request message, and establishing the connection to the terminal.

As an optional implementation, the AMF entity in the first network may complete the registration process, the AUSF entity in the first network completes the authentication and identification process, and the SMF in the first network establishes a connection to the terminal.

In some implementations, the foregoing authentication and identification process includes a real-name authentication process. In some implementations, the first network may obtain subscription data of the terminal from the second network. The real-name authentication process may include any one of the following:

in a case that the terminal and the second network have been authenticated by real names, completing, by the first network, the real-name authentication process by interacting with the second network; and in a case that the terminal and the second network have not been authenticated by real names, completing, by the first network and the terminal, the real-name authentication process through a real-name authentication interaction process.

In some implementations, in a case that the subscription data does not include a terminal identifier, the process of establishing a connection to a terminal may include: receiving the registration request message sent by the terminal, skipping the authentication and identification process in the registration process initiated according to the registration request message, and establishing the connection to the terminal.

Further, when a slice requested by the terminal needs to perform a network slice-specific authorization and authentication (NSSAA) process, before establishing the connection (such as a PDU session connection) to the terminal, the first network may also perform the network slice-specific authorization and authentication process on the slice requested by the terminal.

In some implementations, the network slice-specific authorization and authentication process includes: a real-name authentication process completed through a real-name authentication interaction process. In some implementations, the first network interacts with the network, and the second network completes a Network Slice-Specific Authentication, Authorization, and Accounting (AAA) server function.

In some implementations, based on the service agreement content negotiated with the second network, the first network may send policy information for obtaining a service to the terminal. The policy information for obtaining a service includes but is not limited to a URSP, an access and mobility management policy, and the like. The URSP may include information such as a slice identifier of the PDU session established by the terminal for obtaining the data service, a DNN, and the like. However, the second network dynamically updates the service requirement information to the first network (directly through a PCF or an NEF) entity, which is used for the first network to dynamically generate service policy information.

In some implementations, before the first network establishes a connection to the terminal, a real-name authentication process in a secondary authorization or authentication process with the terminal may be performed and completed. In some implementations, the first network interacts with the second network, and the second network completes a Data Network (DN)-AAA server function.

In some embodiments of the present application, while or after the terminal obtains the subscription service, the first network and the second network complete a charging function. The first network (such as a CHF entity in the first network) may perform the following operations: performing statistics on charging data, generating charging information, and sending the charging information to the terminal; or performing statistics on charging data, and sending the charging data obtained through statistics to the second network, so that the second network generates charging information and sends the charging information to the terminal.

Figure 4:
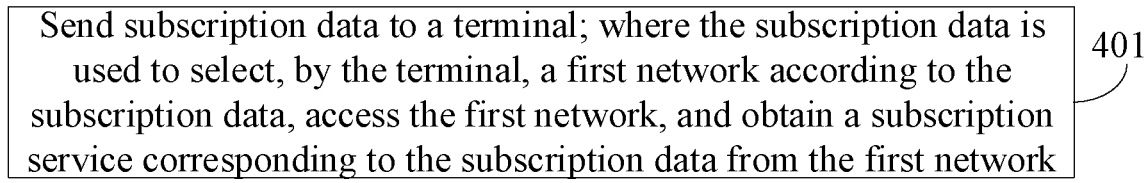
FIG. 4 is a flowchart of another service obtaining method according to an embodiment of the present application.

Referring to FIG. 4, FIG. 4 is a flowchart of a service obtaining method according to an embodiment of the present application. The method is applied to a network side device in a second network, including but not limited to a base station, an AMF, an AUSF, an SMF, a CHF, and the like. As shown in FIG. 4, the method includes the following steps.

Step 401: send subscription data to a terminal; where the subscription data is used to select, by the terminal, a first network according to the subscription data, access the first network, and obtain a subscription service corresponding to the subscription data from the first network.

In some embodiments, the first network and the second network may belong to a same network, or may belong to different networks. The first network may be a 5G PLMN, an NPN, or another mobile communication network. The second network may be a 5G PLMN, an NPN, a third-party service provider network, a handset manufacturer's network, or another mobile communication network.

For specific content of the subscription data, reference may be made to the description of the foregoing method embodiment in FIG. 2, and details are not further described herein.

In the service obtaining method of the embodiment of the present application, it is possible to support the terminal to dynamically obtain subscription data through a third-party entity, and to obtain a subscription service in a current network (previously not associated with the terminal) based on the subscription data, thereby enriching the service obtaining method.

In this embodiment of the present application, the second network may negotiate agreement content for providing a service for the terminal with the first network. The agreement content includes at least one of the following: a subscription service name, location information for providing a subscription service, time information for providing a subscription service, a token, and a service security certificate.

In some implementations, based on the agreement content, the second network may receive at least one of the following from the first network: a slice identifier, service QoS information, DNN, and the like.

In some implementations, based on the agreement content, the second network may send subscription data of the terminal to the first network.

In some implementations, the agreement content may further include at least one of the following: whether a slice requested by a terminal needs to perform a Network Slice-Specific Authorization and Authentication (NSSAA) process, whether the terminal needs to perform a secondary authorization or authentication process, a charging mechanism of the first network and the second network, and a real-name authentication mechanism.

In some implementations, the second network may also perform any one of the following: sending subscription data of the terminal to the first network by interacting with the first network; or performing and completing a network slice-specific authorization and authentication process by interacting with the first network; or performing and completing a data network authorization and authentication process by interacting with the first network. The second network dynamically provides a service QoS requirement, so that the first network can generate policy information.

In some implementations, the second network may also dynamically request a service provision requirement to the first network, so that the first network generates policy information for obtaining a service and sends the policy information for obtaining a service to the terminal. The policy information for obtaining a service includes but is not limited to a User equipment Routing Selection Policy (URSP) an access and mobility management policy, and the like. The URSP may include information such as a slice identifier of the PDU session established by the terminal for obtaining the data service, a DNN, and the like.

In this embodiment of the present application, while or after the terminal obtains the subscription service, the first network and the second network complete a charging function. The second network may perform the following operations: receiving charging information generated by the first network, and performing charging division with the first network; or receiving charging data generated by the first network, generating charging information according to the charging data, sending the charging information to the terminal, and performing charging division with the first network.

The following describes the service obtaining process in the present application with reference to a specific application scenario.

Application scenario 1: a roaming scenario

Sub-scenario 1: The first network is a Visited PLMN (VPLMN) or a Visited NPN, and the second network is a Home PLMN (HPLMN) or a Home NPN;

Sub-scenario 2: The first network is a VPLMN or a Visited NPN, and the second network is a handset manufacturer's network or entity.

For this roaming scenario, all the solutions described in the above embodiments of FIG. 2 to FIG. 4 are applicable. The special description is as follows (the solutions not described herein are applicable to this scenario):

(1) if the subscription data obtained from the second network is temporary subscription data, the subscription data for a certain period of time is applicable to this scenario, the subscription data for a certain service is not used in this scenario, and the subscription data for a specific location does not apply to this scenario;

(2) in this scenario, the manner in which the second network provides a subscription for the terminal may be provided in a form of an application layer and/or a physical entity;

(3) this scenario applies when the subscription data is embodied in a form of subscription data including the terminal identifier; other forms such as a service access identifier including at least one of a user name and a password are not applicable to this scenario, and the corresponding terminal authentication process in this case is not applicable to this scenario;
(4) in this scenario, the terminal may determine that the first network is able to provide the subscription service by using an identifier including the first network in a network identifier for providing the service given in the subscription data of the second network. However, it is not applicable to determine that the first network is able to provide the subscription service by means of the indication identifier in the broadcast information of the first network;
(5) when the second network is an HPLMN or a Home NPN, the content of a.1.2 in the above-mentioned embodiment of FIG. 2 is applicable to this scenario, the content of a.1.1 is not applicable to this scenario, and the content of a.2 is not applicable to this scenario; when the second network is a handset manufacturer's network, the content of a.1.1 in the above-mentioned embodiment of FIG. 2 is applicable to this scenario, the content of a.1.2 is not applicable to this scenario, and the content of a.2 is not applicable to this scenario;
(6) when the second network is an HPLMN or a Home NPN, the applicable real-name authentication process is as follows: the terminal and the second network have been authenticated by real names, the terminal completes the real-name authentication process while obtaining the subscription data from the second network, and the first network completes the real-name authentication process by interacting with the second network; and when the second network is a handset manufacturer's network, the applicable real-name authentication process is as follows: the terminal and the second network have not been authenticated by real names, the first network and the terminal complete the real-name authentication process through a real-name authentication interaction process; and
(7) in this scenario, the applicable charging method is as follows: the first network and the second network agree that a charging execution body is the second network, and agree on a charging division method; the first network completes the charging data statistics and provides it to the second network, the second network charges the terminal, and divides the charging according to the agreement with the first network.

Application scenario 2: a competition event scenario, a concert hall scenario, or a movie theater scenario In this scenario, the first network may be a VPLMN or a Visited NPN, and the second network may be a network or entity corresponding to a competition event/concert hall/movie provider.

For this scenario, all the solutions described in the above embodiments of FIG. 2 to FIG. 4 are applicable. The special description is as follows (the solutions not described herein are applicable to this scenario):
(1) the permanent subscription data is not applicable to this scenario;
(2) if the subscription data obtained from the second network is temporary subscription data, the subscription data for a certain period of time, the subscription data for a certain service, and the subscription data for a specific location are all applicable to this scenario;
(3) in this scenario, the manner in which the second network provides a subscription for the terminal may be provided in a form of an application layer or in a form of an application layer and a physical entity; and a form of a separate physical entity is not applicable to this scenario;
(4) the embodiments of the subscription data described in the above-mentioned embodiment of FIG. 2 are all applicable to this scenario;
(5) the methods of determining that the first network is able to provide the subscription service described in the above-mentioned embodiment of FIG. 2 are all applicable to this scenario;
(6) the content of a.1.1 in the above-mentioned embodiment of FIG. 2 is not applicable to this scenario, the content of a.1.2 is applicable to this scenario, and the content of a.2 is applicable to this scenario;
(7) the real-name authentication processes described in the above-mentioned embodiment of FIG. 2 are all applicable to this scenario; and
(8) the charging solutions described in the above-mentioned embodiment of FIG. 2 are all applicable to this scenario.

Application scenario 3: a shopping mall scenario

In this scenario, the first network may be a VPLMN or a Visited NPN, and the second network may be a network or entity corresponding to a shopping mall.

For this scenario, all the solutions described in the above embodiments of FIG. 2 to FIG. 4 are applicable. The special description is as follows (the solutions not described herein are applicable to this scenario):
(1) the permanent subscription data is not applicable to this scenario;
(2) if the subscription data obtained from the second network is temporary subscription data, the subscription data for a specific location is applicable to this scenario, and the subscription data for a certain period of time and the subscription data for a certain service are not applicable to this scenario;
(3) in this scenario, the manner in which the second network provides a subscription for the terminal may be provided in a form of an application layer or in a form of an application layer and a physical entity; and a form of a separate physical entity is not applicable to this scenario;
(4) the embodiments of the subscription data described in the above-mentioned embodiment of FIG. 2 are all applicable to this scenario;
(5) the methods (except based on a service content identifier) of determining that the first network is able to provide the subscription service described in the above-mentioned embodiment of FIG. 2 are all applicable to this scenario;
(6) the content of a.1.1 in the above-mentioned embodiment of FIG. 2 is not applicable to this scenario, the content of a.1.2 is applicable to this scenario, and the content of a.2 is applicable to this scenario;
(7) the real-name authentication processes described in the above-mentioned embodiment of FIG. 2 are all applicable to this scenario; and
(8) the charging solutions described in the above-mentioned embodiment of FIG. 2 are all applicable to this scenario.

It should be noted that an execution subject of the service obtaining method provided in this embodiment of the present application may be a service obtaining apparatus or a control module in the service obtaining apparatus for executing the service obtaining method. In some embodiments of the present application, that the service obtaining apparatus executes the service obtaining method is taken as an example to describe the service obtaining apparatus provided in this embodiment of the present application.

Figure 5:
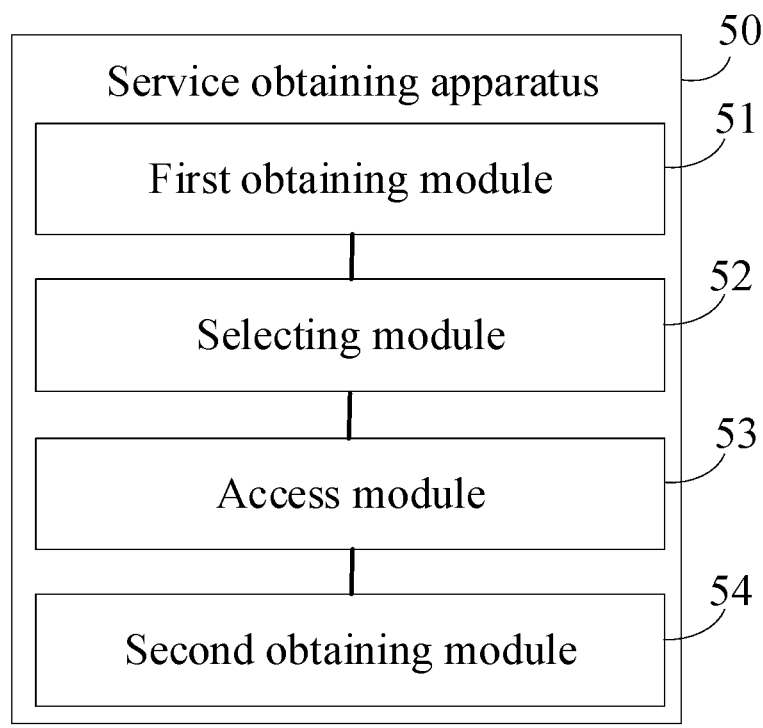
FIG. 5 is a schematic structural diagram of a service obtaining apparatus according to an embodiment of the present application.

Referring to FIG. 5, FIG. 5 is a schematic structural diagram of a service obtaining apparatus according to an embodiment of the present application. As shown in FIG. 5, the service obtaining apparatus 50 may include:

a first obtaining module 51, configured to obtain subscription data from a second network;

a selecting module 52, configured to select a first network by using the subscription data;

an access module 53, configured to access the first network; and a second obtaining module 54, configured to obtain a subscription service corresponding to the subscription data from the first network.

In some implementations, the subscription data is any one of permanent subscription data and temporary subscription data.

In some implementations, the obtaining subscription data from a second network includes any one of the following:

obtaining the subscription data through an application layer of the second network;

obtaining the subscription data through a physical entity of the second network; and obtaining the subscription data through the application layer and the physical entity of the second network.

In some implementations, the subscription data may be any one of the following: subscription data including a terminal identifier; and a service access identifier including at least one of a user name and a password.

In some implementations, the subscription data includes at least one of the following:

a subscription service name;
location information for providing a subscription service;
time information for providing a subscription service;
one or more first network identifiers;
a second network identifier;
an access security token;
a service security certificate;
a slice identifier for providing a subscription service;
QoS information for providing a subscription service; and
a data network name for providing a subscription service.

In some implementations, the service obtaining apparatus 50 further includes:

a first execution module, configured to perform and complete a user real-name authentication process.

In some implementations, the service obtaining apparatus 50 further includes:

a determining module, configured to determine that the first network is able to provide the subscription service through the subscription data and/or an indication identifier in broadcast information of the first network.

In some implementations, the determining module is configured for any one of the following:

in a case that the indication identifier is a service name, if the service name is included in a subscription service name provided by the subscription data, determining that the first network is able to provide the subscription service;

in a case that the indication identifier is service location information, if the service location information is included in location information that is for providing a subscription service and is provided by the subscription data, determining that the first network is able to provide the subscription service;

in a case that the indication identifier is a second network identifier, if the second network identifier is a second network identifier provided by the subscription data, determining that the first network is able to provide the subscription service; and in a case that the indication identifier is a first network identifier, if one or more first network identifiers included in the subscription data include the first network identifier, determining that the first network is able to provide the subscription service.

In some implementations, the determining module includes:

an obtaining unit, configured to obtain the broadcast information of the first network, where the broadcast information includes a first ciphertext;

a decrypting unit, configured to decrypt the first ciphertext by using a token obtained from the second network;

a first determining unit, configured to determine, in a case of decrypting to obtain a plaintext indication identifier, that the first network is a legitimate network authorized by the second network; and a second determining unit, configured to determine, if the plaintext indication identifier is included in the subscription data, that the first network is able to provide the subscription service.

In some implementations, the access module 53 is configured to:

send a registration request message to the first network by using the subscription data, complete an authentication and identification process in a registration process initiated according to the registration request message, and access the first network.

In some implementations, the registration request message includes: a slice identifier that provides a service for the terminal.

In some implementations, the authentication and identification process includes a real-name authentication process; and the real-name authentication process includes any one of the following:

in a case that the terminal and the second network have been authenticated by real names, completing, by the terminal, the real-name authentication process while obtaining the subscription data from the second network, and completing, by the first network, the real-name authentication process by interacting with the second network; and in a case that the terminal and the second network have not been authenticated by real names, completing, by the terminal and the first network, the real-name authentication process through a real-name authentication interaction process.

In some implementations, in a case that the subscription data does not include a terminal identifier, the access module 53 is further configured to: send a registration request message to the first network by using the subscription data, skip the authentication and identification process in the registration process initiated according to the registration request message, and access the first network.

In some implementations, when the first network and the second network agree to authenticate the terminal in a form of performing a network slice-specific authorization and authentication process, the service obtaining apparatus 50 further includes:

a second execution module, configured to perform and complete, before establishing the PDU session data connection, a network slice-specific authorization and authentication process that is for a slice requested by a terminal and is initiated by the first network.

In some implementations, the network slice-specific authorization and authentication process includes: a real-name authentication process completed through a real-name authentication interaction process.

In some implementations, the second obtaining module 54 is configured to: send a PDU session establishment request to the first network, establish a PDU session data connection according to the PDU session establishment request, and obtain the subscription service corresponding to the subscription data through the PDU session data connection.

In some implementations, the service obtaining apparatus 50 further includes:
a third execution module, configured to perform and complete a real-name authentication process in a secondary authorization or authentication process initiated by the first network.

In some implementations, the service obtaining apparatus 50 further includes:
a fourth execution module, configured to perform, while or after obtaining the subscription service corresponding to the subscription data from the first network, charging data statistics and reporting according to indications of the first network.

It may be understood that the service obtaining apparatus 50 provided in this embodiment of the present application can implement various processes implemented in the method embodiment in FIG. 2, and achieve a same technical effect. To avoid repetition, details are not described herein again.

Figure 6:
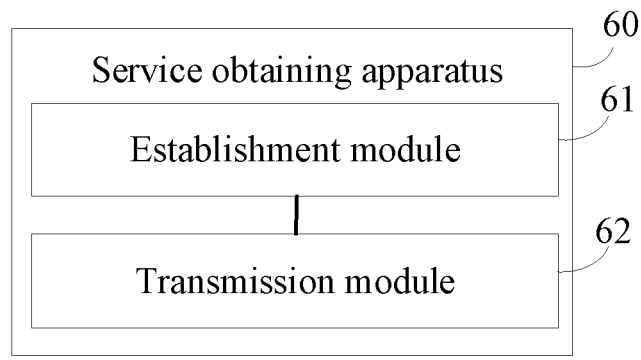
FIG. 6 is a schematic structural diagram of another service obtaining apparatus according to an embodiment of the present application.

Referring to FIG. 6, FIG. 6 is a schematic structural diagram of a service obtaining apparatus according to an embodiment of the present application, and the apparatus is applied to a network side device in a first network. As shown in FIG. 6, the service obtaining apparatus 60 may include:
an establishment module 61, configured to establish a connection to a terminal, where the connection is requested to be established by the terminal using subscription data, and the subscription data is obtained by the terminal from a second network; and
a transmission module 62, configured to transmit a subscription service corresponding to the subscription data to the terminal.

In some implementations, the service obtaining apparatus 60 further includes:
a first negotiation module, configured to negotiate, with the second network, agreement content for providing a service for the terminal; where the agreement content includes at least one of the following: a subscription service name, location information for providing a subscription service, time information for providing a subscription service, a token, and a service security certificate.

In some implementations, the service obtaining apparatus 60 further includes:
a first transceiver module, configured to: based on the agreement content, send at least one of the following to the second network: a slice identifier, service QoS information, and data network information; and/or based on the agreement content, obtain subscription data of the terminal from the second network.

In some implementations, the agreement content further includes at least one of the following:
whether a slice requested by a terminal needs to perform a network slice-specific authorization and authentication process, whether the terminal needs to perform a secondary authorization or authentication process, a charging mechanism of the first network and the second network, and a real-name authentication mechanism.

In some implementations, the first transceiver module is further configured to: based on the agreement content, send broadcast information to the terminal;
where the broadcast information includes an indication identifier or an indication identifier encrypted with a token; and the indication identifier is used to determine, by the terminal, that the first network is able to provide the subscription service.

In some implementations, the establishment module 61 is configured to:
receive a registration request message sent by the terminal, complete an authentication and identification process in a registration process initiated according to the registration request message, and establish the connection to the terminal.

In some implementations, the authentication and identification process includes a real-name authentication process; and the real-name authentication process includes any one of the following:
in a case that the terminal and the second network have been authenticated by real names, completing, by the first network, the real-name authentication process by interacting with the second network; and
in a case that the terminal and the second network have not been authenticated by real names, completing, by the first network and the terminal, the real-name authentication process through a real-name authentication interaction process.

In some implementations, in a case that the subscription data does not include a terminal identifier, the establishment module 61 is configured to:
receive the registration request message sent by the terminal, skip the authentication and identification process in the registration process initiated according to the registration request message, and establish the connection to the terminal.

In some implementations, the service obtaining apparatus 60 further includes:
a fifth execution module, configured to perform, before the establishing a connection to the terminal, the network slice-specific authorization and authentication process on the slice requested by the terminal.

In some implementations, the network slice-specific authorization and authentication process includes: a real-name authentication process completed through a real-name authentication interaction process.

In some implementations, the first transceiver module is further configured to: based on the agreement content, send policy information for obtaining a service to the terminal.

In some implementations, the service obtaining apparatus 60 further includes:
a sixth execution module, configured to perform and complete a real-name authentication process in a secondary authorization or authentication process with the terminal.

In some implementations, the service obtaining apparatus 60 further includes:
a first charging module, configured to perform statistics on charging data, generate charging information, and send the charging information to the terminal; or perform statistics on charging data, and send the charging data obtained through statistics to the second network, so that the second network generates charging information and sends the charging information to the terminal.

It may be understood that the service obtaining apparatus 60 provided in this embodiment of the present application can implement various processes implemented in the method embodiment in FIG. 3, and achieve a same technical effect. To avoid repetition, details are not described herein again.

Figure 7:
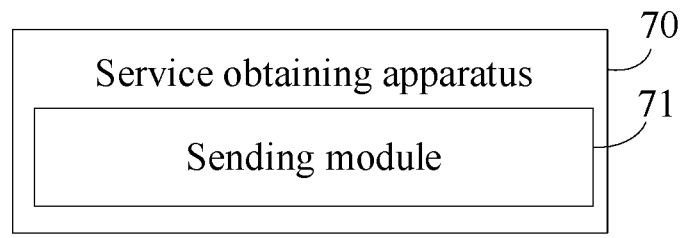
FIG. 7 is a schematic structural diagram of another service obtaining apparatus according to an embodiment of the present application.

Referring to FIG. 7, FIG. 7 is a schematic structural diagram of a service obtaining apparatus according to an embodiment of the present application, and the apparatus is applied to a network side device in a second network. As shown in FIG. 7, the service obtaining apparatus 70 may include:

a sending module 71, configured to send subscription data to a terminal; where the subscription data is used to select, by the terminal, a first network according to the subscription data, access the first network, and obtain a subscription service corresponding to the subscription data from the first network.

In some implementations, the service obtaining apparatus 70 further includes:

a second negotiation module, configured to negotiate, with the first network, agreement content for providing a service for the terminal; where the agreement content includes at least one of the following: a subscription service name, location information for providing a subscription service, time information for providing a subscription service, a token, and a service security certificate.

In some implementations, the service obtaining apparatus 70 further includes:

a second transceiver module, configured to: based on the agreement content, receive at least one of the following from the first network: a slice identifier, service QoS information, and data network information;

and/or based on the agreement content, send subscription data of the terminal to the first network.

In some implementations, the agreement content further includes at least one of the following:

whether a slice requested by a terminal needs to perform a network slice-specific authorization and authentication process, whether the terminal needs to perform a secondary authorization or authentication process, a charging mechanism of the first network and the second network, and a real-name authentication mechanism.

In some implementations, the service obtaining apparatus 70 further includes:

a sixth execution module, configured for any one of the following:

sending subscription data of the terminal to the first network by interacting with the first network;

or performing and completing a network slice-specific authorization and authentication process by interacting with the first network;

or performing and completing a data network authorization and authentication process by interacting with the first network;

or dynamically requesting a service provision requirement to the first network, so that the first network generates policy information for obtaining a service, and sends the policy information for obtaining a service to the terminal.

In some implementations, the service obtaining apparatus 70 further includes:

a second charging module, configured to receive charging information generated by the first network, and perform charging division with the first network; or receive charging data generated by the first network, generate charging information according to the charging data, send the charging information to the terminal, and perform charging division with the first network.

It may be understood that the service obtaining apparatus 70 provided in this embodiment of the present application can implement various processes implemented in the method embodiment in FIG. 4, and achieve a same technical effect. To avoid repetition, details are not described herein again.

The service obtaining apparatus in this embodiment of the present application may be an apparatus, or a component, an integrated circuit, or a chip in a terminal. The apparatus may be a mobile terminal or a non-mobile terminal. For example, the mobile terminal may include, but is not limited to, the types of terminals 11 listed above, and the non-mobile terminal may be a server, a Network Attached Storage (NAS), a personal computer, a television, an automated teller machine, a self-service machine, or the like. This is not specifically limited in the embodiments of the present application.

The service obtaining apparatus in this embodiment of the present application may be an apparatus with an operating system. The operating system may be an Android operating system, may be an iOS operating system, or may be another possible operating system, which is not specifically limited in the embodiments of the present application.

Figure 8:
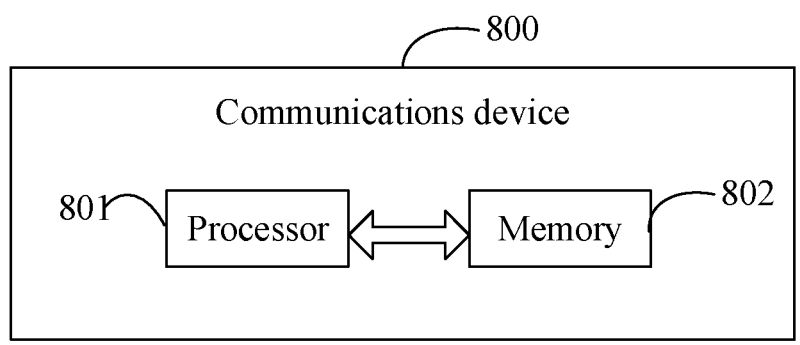
FIG. 8 is a schematic structural diagram of a communications device according to an embodiment of the present application.

In some implementations, as shown in FIG. 8, an embodiment of the present application further provides a communications device 800, including a processor 801, a memory 802, and a program or an instruction stored in the memory 802 and executable on the processor 801. For example, when the communications device 800 is a terminal, and when the program or the instruction is executed by the processor 801, each process of the foregoing method embodiment in FIG. 2 can be implemented, and a same technical effect can be achieved. When the communications device 800 is a network side device in a first network, and when the program or the instruction is executed by the processor 801, each process of the foregoing method embodiment in FIG. 3 can be implemented, and a same technical effect can be achieved. To avoid repetition, details are not described herein again. When the communications device 800 is a network side device in a second network, and when the program or the instruction is executed by the processor 801, each process of the foregoing method embodiment in FIG. 4 can be implemented, and a same technical effect can be achieved. To avoid repetition, details are not described herein again.

Figure 9:
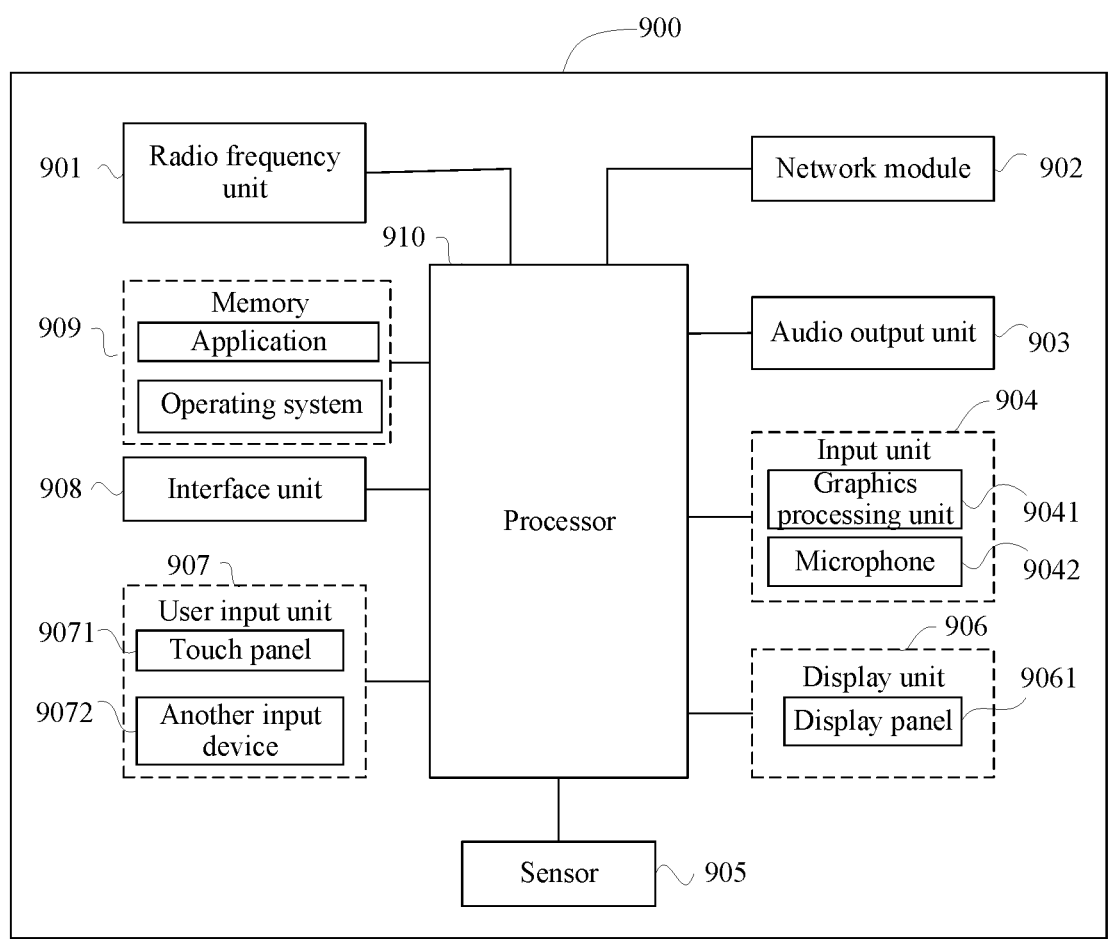
FIG. 9 is a schematic structural diagram of a terminal according to an embodiment of the present application.

FIG. 9 is a schematic diagram of a hardware structure of a terminal according to an embodiment of the present application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

The terminal 900 may further include a power supply (for example, a battery) that supplies power to the components. The power supply may be logically connected to the processor 910 by using a power management system, so as to implement functions such as charging management, discharging management, and power consumption management by using the power management system. A structure of the terminal shown in FIG. 9 does not constitute a limitation on the terminal, and the terminal may include more or fewer components than those shown in the figure, or combine some components, or have different component arrangements, and details are not further described herein.

It should be understood that, in this embodiment of the present application, the input unit 904 may include a Graphics Processing Unit (GPU) 9049 and a microphone 9042. The graphics processing unit 9049 processes image data of a static picture or a video obtained by an image capture apparatus (such as a camera) in a video capture mode or an image capture mode. The display unit 906 may include a display panel 9069, and the display panel 9069 may be configured in a form of a liquid crystal display, an organic light-emitting diode, or the like. The user input unit 907 includes a touch panel 9079 and another input device 9072. The touch panel 9079 is also referred to as a touchscreen. The touch panel 9079 may include two parts: a touch detection apparatus and a touch controller. The another input device 9072 may include but is not limited to a physical keyboard, a function key (such as a volume control key or an on/off key), a trackball, a mouse, a joystick, and the like. Details are not described herein.

In some embodiments of the present application, the radio frequency unit 901 receives downlink data from a network side device, and transmits the downlink data to the processor 910 for processing; and in addition, transmits uplink data to the network side device. Usually, the radio frequency unit 901 includes but is not limited to an antenna, at least one amplifier, a transceiver, a coupler, a low noise amplifier, a duplexer, and the like.

The memory 909 may be configured to store a software program or instruction and various data. The memory 909 may mainly include a program storage area or an instruction area and a data storage area. The program storage area or the instruction area may store an operating system, an application program or instruction required by at least one function (such as a sound play function or a picture play function), and the like. In addition, the memory 909 may include a high-speed random access memory, and may further include a nonvolatile memory. The non-volatile memory may be a Read-Only Memory (ROM), a Programmable ROM (PROM), an Erasable PROM (EPROM), an Electrically EPROM (EEPROM), or a flash memory. For example, at least one magnetic disk storage component, a flash memory component, or another volatile solid-state storage component.

The processor 910 may include one or more processing units. In some implementations, the processor 910 may integrate an application processor with a modem processor. The application processor mainly processes the operating system, a user interface, the application program or instruction, and the like, and the modem processor mainly processes wireless communication such as a baseband processor. It can be understood that, alternatively, the modem processor may not be integrated into the processor 910.

The processor 910 is configured to obtain subscription data from a second network, select a first network by using the subscription data, access the first network, and obtain a subscription service corresponding to the subscription data from the first network.

It may be understood that the terminal 900 provided in this embodiment of the present application can implement various processes implemented in the method embodiment in FIG. 2, and achieve a same technical effect. To avoid repetition, details are not described herein again.

Figure 10:
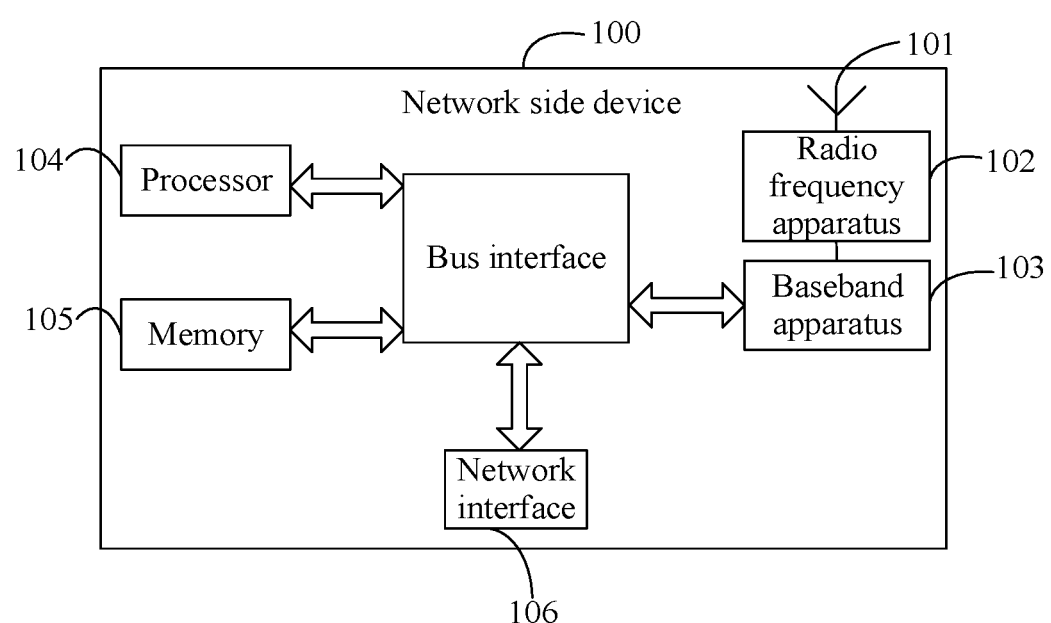
FIG. 10 is a schematic structural diagram of a network side device according to an embodiment of the present application.

In some implementations, the present application further provides a network side device. As shown in FIG. 10, the network side device 100 includes an antenna 101, a radio frequency apparatus 102, and a baseband apparatus 103. The antenna 101 is connected to the radio frequency apparatus 102. In an uplink direction, the radio frequency apparatus 102 receives information by using the antenna 101, and sends the received information to the baseband apparatus 103 for processing. In a downlink direction, the baseband apparatus 103 processes to-be-sent information, and sends the to-be-sent information to the radio frequency apparatus 102. After processing the received information, the radio frequency apparatus 102 sends the information by using the antenna 101.

The foregoing band processing apparatus may be located in the baseband apparatus 103, and the method performed by the network side device in the foregoing embodiment may be implemented in the baseband apparatus 103. The baseband apparatus 103 includes a processor 104 and a memory 105.

For example, the baseband apparatus 103 may include at least one baseband board. Multiple chips are disposed on the baseband board. As shown in FIG. 10, one chip is, for example, the processor 104, and is connected to the memory 105, to invoke a program in the memory 105 to perform an operation of the network side device shown in the foregoing method embodiment.

The baseband apparatus 103 may further include a network interface 106, configured to exchange information with the radio frequency apparatus 102, where the interface is, for example, a Common Public Radio Interface (CPRI).

In some implementations, the network side device in this embodiment of the present application further includes: an instruction or a program stored in the memory 105 and capable of running on the processor 104, and the processor 104 invokes the instruction or program in the memory 105 to perform the method performed by the modules show in FIG. 6 or FIG. 7, and achieve a same technical effect. To avoid repetition, details are not described herein again.

The present application further provides a readable storage medium. The readable storage medium stores a program or an instruction, and when the program or the instruction is executed by a processor, the processes of the foregoing method embodiment shown in FIG. 2, or the processes of the foregoing method embodiment shown in FIG. 3, or the processes of the foregoing method embodiment shown in FIG. 4 are implemented, and a same technical effect is achieved. To avoid repetition, details are not described herein again.

The processor is a processor in the terminal in the foregoing embodiments. The readable storage medium includes a computer-readable storage medium such as a computer ROM, a Random Access Memory (RAM), a magnetic disk, or an optical disc.

The present application further provides a chip, where the chip includes a processor and a communication interface, the communication interface is coupled to the processor, and the processor is configured to run a program or an instruction to implement the processes of the foregoing method embodiment shown in FIG. 2, or the processes of the foregoing method embodiment shown in FIG. 3, or the processes of the foregoing method embodiment shown in FIG. 4, and achieve a same technical effect. To avoid repetition, details are not described herein again.

It should be understood that the chip mentioned in this embodiment of the present application may also be referred to as a system-level chip, a system chip, a chip system, an on-chip system chip, and the like.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the foregoing described system, apparatus, and unit, reference may be made to a corresponding process in the foregoing method embodiments, and details are not described herein again.

In the embodiments provided in the present application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present application.

A person of ordinary skill in the art may understand that all or some of the processes in the foregoing method embodiments may be implemented by using a computer program to control related hardware. The program may be stored in a computer readable storage medium. When the program is executed, the processes in the foregoing method embodiments may be performed. The storage medium includes a magnetic disk, a compact disc, a ROM, a RAM, or the like.

It can be understood that the embodiments described in the present disclosure may be implemented by hardware, software, firmware, middleware, microcode, or a combination thereof. For hardware implementation, a module, a unit, or a subunit may be implemented in one or more Application Specific Integrated Circuits (ASIC), Digital Signal Processor (DSP), DSP Device (DSPD), Programmable Logic Device (PLD), Field-Programmable Gate Array (FPGA), general purpose processors, controllers, microcontrollers, microprocessors, or other electronic units or a combination thereof used to perform the functions in the present disclosure.

For software implementations, the techniques described in the embodiments of the present disclosure may be implemented by modules (for example, processes and functions) that perform the functions described in the embodiments of the present disclosure. A software code may be stored in the memory and executed by the processor. The memory may be implemented in the processor or outside the processor.

The embodiments of the present application are described above with reference to the accompanying drawings, but the present application is not limited to the foregoing specific implementations. The foregoing specific implementations are merely schematic instead of restrictive. Under enlightenment of the present application, a person of ordinary skills in the art may make many forms without departing from aims and the protection scope of claims of the present application, all of which fall within the protection scope of the present application.

The invention claimed is:

1. A service obtaining method, performed by a terminal, wherein the method comprises:
    obtaining subscription data from a second network;
        wherein the subscription data is used for authentication on the first network:
    determining that a first network is able to provide a subscription service through the subscription data or an indication identifier in broadcast information of the first network:
    selecting the first network and accessing the first network; and obtaining the subscription service corresponding to the subscription data from the first network,
wherein determining that the first network is able to provide the subscription service comprises at least one of the following:
when the indication identifier is a service name, when the service name is comprised in a subscription service name provided by the subscription data, the first network is determined to be able to provide the subscription service;
when the indication identifier is service location information, when the service location information is comprised in location information provided by the subscription data, the first network is determined to be able to provide the subscription service;
when the indication identifier is a network identifier of the second network, when the network identifier of the second network are among one or more network identifiers provided by the subscription data, the first network is determined to be able to provide the subscription service; or
when the indication identifier is a network identifier of the first network, when the network identifier of the first network is among the one or more network identifiers provided by the subscription data, the first network is determined to be able to provide the subscription service.

2. The method according to claim 1, wherein the subscription data is any one of permanent subscription data or temporary subscription data.

3. The method according to claim 1, wherein the obtaining subscription data from a second network comprises any one of following:
obtaining the subscription data through an application layer of the second network;
obtaining the subscription data through a physical entity of the second network; or
obtaining the subscription data through the application layer and the physical entity of the second network.

4. The method according to claim 1, wherein the subscription data is any one of following:
subscription data comprising a terminal identifier; or
a service access identifier comprising at least one of a user name and a password.

5. The method according to claim 1, wherein the subscription data comprises at least one of following:
a subscription service name;
location information for providing a subscription service;
time information for providing a subscription service;
one or more first network identifiers;
a second network identifier;
an access security token;
a service security certificate;
a slice identifier for providing a subscription service;
Quality of Service (QOS) information for providing a subscription service; or
a data network name for providing a subscription service.

6. The method according to claim 1, wherein the accessing the first network comprises:
sending a registration request message to the first network by using the subscription data;
completing an authentication and identification process in a registration process initiated according to the registration request message; and
accessing the first network, wherein the registration request message comprises: a slice identifier that provides a service for the terminal.

7. The method according to claim 6, wherein the authentication and identification process comprises a real-name authentication process; and the real-name authentication process comprises any one of following:
when the terminal and the second network have been authenticated by real names, completing, by the terminal, the real-name authentication process while obtaining the subscription data from the second network, and completing, by the first network, the real-name authentication process by interacting with the second network; or
when the terminal and the second network have not been authenticated by real names, completing, by the terminal and the first network, the real-name authentication process through a real-name authentication interaction process.

8. The method according to claim 6, wherein when the subscription data does not comprise a terminal identifier, after the sending a registration request message to the first network, the method further comprises:
skipping the authentication and identification process in the registration process initiated according to the registration request message; and
accessing the first network.

9. The method according to claim 1, wherein the obtaining a subscription service corresponding to the subscription data from the first network comprises:
sending a Packet Data Unit (PDU) session establishment request to the first network, establishing a PDU session data connection according to the PDU session establishment request; and
obtaining the subscription service corresponding to the subscription data through the PDU session data connection.

10. A service obtaining method, performed by a network side device in a first network, wherein the method comprises:
establishing a connection to a terminal, wherein the connection is requested to be established by the terminal using subscription data, and the subscription data is obtained by the terminal from a second network and is used for authentication on the first network;
sending broadcast information to the terminal to determine that the first network is able to provide subscription service;
wherein the broadcast information comprises an indication identifier or an indication identifier encrypted with a token,
wherein determining that the first network is able to provide the subscription service comprises at least one of the following:
wherein when the indication identifier is a service name, when the service name is comprised in a subscription service name provided by the subscription data, the first network is determined to be able to provide the subscription service:
when the indication identifier is service location information, when the service location information is comprised in location information provided by the subscription data, the first network is determined to be able to provide the subscription service;
when the indication identifier is a network identifier of the second network, when the network identifier of the second network are among one or more network identifiers provided by the subscription data, the first network is determined to be able to provide the subscription service; or when the indication identifier is a network identifier of the first network, when the network identifier of the first network is among the one or more network identifiers provided by the subscription data, the first network is determined to be able to provide the subscription service; and transmitting a subscription service corresponding to the subscription data to the terminal.

11. The method according to claim 10, further comprising:

negotiating, with the second network, agreement content for providing a service for the terminal, wherein the agreement content comprises at least one of following:

a subscription service name, location information for providing a subscription service, time information for providing a subscription service, a token, or a service security certificate.

12. The method according to claim 11, further comprising:

based on the agreement content, sending at least one of following to the second network: a slice identifier, Quality of Service (QOS) information, or data network information; or based on the agreement content, obtaining subscription data of the terminal from the second network.

13. The method according to claim 11, wherein the agreement content further comprises at least one of following:

whether a slice requested by a terminal needs to perform a network slice-specific authorization and authentication process;

whether the terminal needs to perform a secondary authorization or authentication process;

a charging mechanism of the first network and the second network; or a real-name authentication mechanism.

14. The method according to claim 11, wherein sending broadcast information to the terminal is based on the agreement content.

15. The method according to claim 10, wherein the establishing a connection to a terminal comprises:

receiving a registration request message sent by the terminal;

completing an authentication and identification process in a registration process initiated according to the registration request message; and establishing the connection to the terminal.

16. A terminal, comprising:

a memory storing computer-readable instructions; and a processor coupled to the memory and configured to execute the computer-readable instructions, where the computer-readable instructions, when executed by the processor, cause the processor to perform operations comprising:

obtaining subscription data from a second network, wherein the subscription data is used for authentication on the first network;

determining that a first network is able to provide a subscription service through the subscription data or an indication identifier in broadcast information of the first network;

selecting the first network and accessing the first network; and obtaining the subscription service corresponding to the subscription data from the first network, wherein determining that the first network is able to provide the subscription service comprises at least one of the following:

wherein when the indication identifier is a service name, when the service name is comprised in a subscription service name provided by the subscription data, the first network is determined to be able to provide the subscription service;

when the indication identifier is service location information, when the service location information is comprised in location information provided by the subscription data, the first network is determined to be able to provide the subscription service;

when the indication identifier is a network identifier of the second network, when the network identifier of the second network are among one or more network identifiers provided by the subscription data, the first network is determined to be able to provide the subscription service; or when the indication identifier is a network identifier of the first network, when the network identifier of the first network is among the one or more network identifiers provided by the subscription data, the first network is determined to be able to provide the subscription service.

17. The terminal according to claim 16, wherein the subscription data is any one of permanent subscription data or temporary subscription data.

18. The terminal according to claim 16, wherein the obtaining subscription data from a second network comprises any one of following:

obtaining the subscription data through an application layer of the second network;

obtaining the subscription data through a physical entity of the second network; or obtaining the subscription data through the application layer and the physical entity of the second network.

19. The terminal according to claim 16, wherein the subscription data is any one of following:

subscription data comprising a terminal identifier; or a service access identifier comprising at least one of a user name and a password.

20. The terminal according to claim 16, wherein the subscription data comprises at least one of following:

a subscription service name;
location information for providing a subscription service;
time information for providing a subscription service;
one or more first network identifiers;
a second network identifier;
an access security token;
a service security certificate;
a slice identifier for providing a subscription service;
Quality of Service (QOS) information for providing a subscription service; or
a data network name for providing a subscription service.

* * * * *